May 27, 1941. B. V. MITCHELL 2,243,506
UNITARY VULCANIZING ELEMENT
Filed Aug. 12, 1939
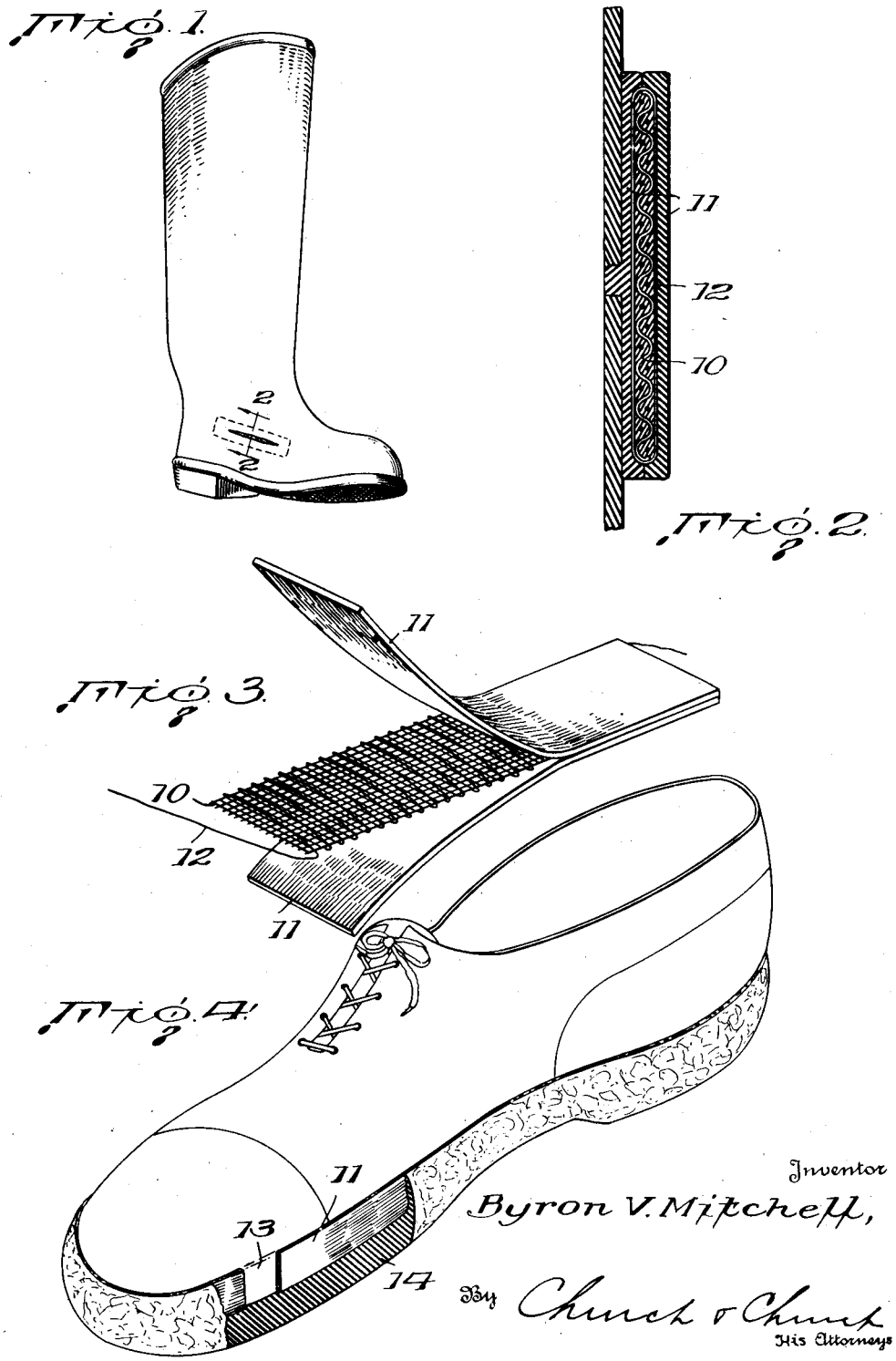
Inventor
Byron V. Mitchell,
By Church & Church
His Attorneys Patented May 27, 1941

2,243,506

UNITED STATES PATENT OFFICE 2,243,506

UNITARY VULCANIZING ELEMENT

Byron V. Mitchell, Jamaica, N. Y.

Application August 12, 1939, Serial No. 289,850

6 Claims. (Cl. 18—18)

This invention relates to improvements in unitary vulcanizing elements and, particularly, to an element for securing a layer of uncured rubber, by vulcanization, to the surface of a previously formed rubber surface.

The primary object of the invention is to provide a unitary vulcanizing element which may be used as a patch for repairing rubber articles, the patch being applied to the surface of the article to be repaired.

A further object is to provide a unitary vulcanizing element in the form of a patch to be applied to the surface of the article to be repaired, the patch comprising uncured rubber to be vulcanized to the surface of the article and means for localizing the flow of uncured rubber on the surface of the article during vulcanization.

Still another object of the invention is to provide a unitary vulcanizing agent especially designed for securing a crepe rubber sole to the leather upper of a shoe, said element comprising a body of uncured rubber adapted to be interposed between the crepe rubber sole and the leather upper entirely around the lower edge of the latter, and a carrier for said uncured rubber also extending around the upper for localizing the flow of uncured rubber during vulcanization.

More specifically, the invention contemplates a unitary vulcanizing element consisting of a porous or perforate carrier, preferably a length of rubberized fabric, having a film or layer of uncured rubber on one or both surfaces thereof with means, preferably in the form of a filamentary electrical conductor directly associated with the uncured rubber, whereby the passage of an electric current through the filament will subject the uncured rubber to a vulcanizing temperature and the flow of the uncured rubber during its vulcanization will be localized or restricted by said carrier or fabric.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a perspective view of a portion of a rubber boot or shoe illustrating the application of the present patch to the surface thereof;

Fig. 2 is a sectional view on the line 2—2 of Fig. 1;

Fig. 3 is a perspective view of the patch; and

Fig. 4 is a perspective view, partly broken out, illustrating the use of the present element for attaching the crepe rubber sole to the upper of a leather shoe.

In the preferred embodiment of the present invention, illustrated in Figs. 1 to 3, the unitary vulcanizing element takes the form of a patch for repairing rents or cuts in rubber articles, such as rubber boots and rubber shoes. The present patch is adapted to be vulcanized to the surface of the article to be repaired in order that it will be permanently and securely attached to the article. For this purpose it comprises a quantity of uncured rubber which is adapted to be raised to a vulcanizing temperature while held with proper pressure against the surface of the article to be repaired. Under such conditions, it is necessary to restrict or localize the flow of this uncured rubber during the vulcanizing step so that, in the present patch, there is a carrier 10 having, preferably on both of its surfaces, a film or layer of uncured rubber 11, the carrier being of such a nature as to localize or restrict the flow of the uncured rubber while the latter is being vulcanized. Preferably, the carrier is formed of a length or strip of rubberized fabric, but other forms of perforate material may be utilized for this purpose, as it is desirable that the uncured rubber be capable of permeating the carrier during vulcanization. The patch also comprises means for subjecting this uncured rubber to the desired vulcanizing temperature, such means preferably consisting of a filamentary electrical conductor 12 directly associated with the uncured rubber. The best results have been obtained where this filament 12 has been spirally arranged in contact with the uncured rubber, as by coiling it around the patch, as illustrated in Fig. 3.

In the use of the patch, it is applied to the surface of the boot or other article to be repaired, so as to completely cover the rent or other damaged surface, and pressed against the surface with the desired pressure while an electrical current is passed through the filament 12. The uncured rubber 11 is thus brought to a vulcanizing temperature, being rendered flowable during such process. However, the presence of the mesh-like carrier tends to restrict or localize the flow of the rubber during this vulcanizing step although, as is shown in Fig. 2, a portion of the uncured rubber may, and usually does, enter the cut in the article so as to produce a complete seal in and around the cut. By confining the uncured rubber to the immediate vicinity of the surface to be repaired, the appearance of the article is not impaired and, at the same time, all of the uncured rubber contained in the patch is utilized in sealing the rent in the article. By vulcanizing the uncured rubber constituting the patch to the surface of the article to be repaired, not only is the rent thoroughly sealed, but the rubber constituting the patch is firmly secured in place and will remain so during continued use of the article. It will also be appreciated that the heat to which the uncured rubber is subjected for purposes of vulcanization can be accurately controlled, so that the rubber and other material of the original article is not detrimentally affected.

In the embodiment of the invention illustrated in Fig. 4, the vulcanizing element is simply made of greater length than the patch previously described. In other words, its length is increased so that it will extend entirely around the shoe upper 13 on the outer surface of the lower edge of the upper. The shoe illustrated in the present instance is of the usual crepe rubber sole type, wherein the crepe rubber sole 14 extends up over the lower portion of the leather upper, as shown, and, by interposing the vulcanizing element, consisting of the carrier 10, uncured rubber 11, and filament 12, between the upper and the overlapping, upwardly-extending portion of the sole, and subjecting the uncured rubber of the vulcanizing element to a vulcanizing temperature, the sole will be securely attached to the upper. Preferably, however, where the element is used in contact with a leather surface, as in the case of the shoe illustrated, a rubber cement is applied to the surface of the leather before placement of the vulcanizing element against the upper. This use of the present element is quite advantageous, not only by reason of the fact that a secure union is had between the crepe rubber sole and leather upper but, also, as previously pointed out, the control of the heat during the vulcanizing step is such that the leather is not detrimentally affected. This control of the heat is especially important where the present element is used in connection with an article containing leather which is in close proximity to the element while the latter is being vulcanized, as the fibrous structure of the leather is quite susceptible to and very easily damaged by unduly high temperatures.

While it is preferred that the filamentary electrical conductor 12 be wrapped around the carrier 10 beneath the uncured rubber, where a rubberized fabric is used for the carrier, it is apparent that the heating element or filament may be incorporated in the carrier itself as, for instance, where the carrier is formed, in part, of a metal filament. It will also be appreciated that the so-called conductor or heating element 12 need not be heated electrically, as sufficient heat units can be transmitted by conduction through the element to vulcanize the raw rubber.

What I claim is:

1. A vulcanizing element consisting of a length of non-metallic mesh material interposed between layers of uncured rubber with means also interposed between said layers of rubber for subjecting the latter to a vulcanizing temperature, the flow of rubber during vulcanization being restricted by said mesh material.

2. A vulcanizing element consisting of a non-metallic perforate strip having uncured rubber secured thereon and a filamentary metallic member directly associated with the rubber whereby heating of said filament will subject the rubber to vulcanizing temperature, the perforate strip constituting a retaining means for restricting the flow of rubber during vulcanization.

3. A vulcanizing element consisting of a length of rubberized fabric with uncured rubber secured thereon and a metallic filament directly associated with the uncured rubber whereby the latter can be subjected to a vulcanizing temperature by heating said filament, the flow of the rubber during vulcanization being localized by said fabric.

4. A unitary repair patch for rubber articles consisting of a length of non-metallic perforate material having uncured rubber on the surface thereof and metallic means directly associated with the uncured rubber through which heat for vulcanization can be imparted to said uncured rubber, said perforate material constituting means for localizing the flow of uncured rubber during vulcanization.

5. A unitary patch for repairing rubber articles at the surface of the article, said patch consisting of a length of rubberized fabric, uncured rubber on said fabric, and a filamentary electrical conductor spirally arranged in contact with the uncured rubber whereby passage of an electric current through said filament will subject the uncured rubber to a vulcanizing temperature, said fabric constituting means for localizing the flow of the uncured rubber on the surface of the article during vulcanization of said rubber.

6. A vulcanizing element for attaching a rubber sole to the leather upper of a shoe, said element consisting of a length of fabric adapted to extend around the outer surface of the lower edge portion of the upper, a layer of uncured rubber carried by and substantially co-extensive with said length of fabric, and a filamentary electrical conductor directly associated with said layer of uncured rubber for subjecting said rubber to a vulcanizing temperature by the passage of an electric current through said filament, the flow of rubber during vulcanization being restricted by said fabric.

BYRON V. MITCHELL.